United States Patent [19]

Litz et al.

[11] Patent Number: 5,004,571
[45] Date of Patent: Apr. 2, 1991

[54] LIQUID LEVEL CONTROL IN GAS-LIQUID MIXING OPERATIONS

[75] Inventors: Lawrence M. Litz, Pleasantville, N.Y.; Mark K. Weise, North Haledon, N.J.; David A. Haid, Westport, Conn.

[73] Assignee: Union Carbide Industrial Gases Technology Corporation, Danbury, Conn.

[21] Appl. No.: 516,775

[22] Filed: Mar. 30, 1990

[51] Int. Cl.⁵ .............................................. B01F 3/04
[52] U.S. Cl. ................................................... 261/91
[58] Field of Search ...................................... 261/91

[56] References Cited

U.S. PATENT DOCUMENTS

Re. 32,562  12/1987  Litz ........................................ 261/91
3,204,768   9/1965   Daniel ..................................... 261/91
3,724,667   4/1973   McKinney ............................. 261/91
4,317,731   3/1982   Roberts, Jr. et al. .................. 261/91
4,328,175   5/1982   Roeckel et al. ....................... 261/91
4,454,077   6/1984   Litz ........................................ 261/91

Primary Examiner—Tim Miles
Attorney, Agent, or Firm—Alvin H. Fritschler

[57] ABSTRACT

A gas-liquid mixing vessel utilizes an axial flow, down-pumping impeller in a draft tube to create vortex development so as to draw gas from the overhead in a body of recirculating liquid. A surge tank is used to accommodate volume changes in the vessel, and a liquid level control feature, in which the gas phase pressures in the mixing vessel and the surge tank are adjusted, is used to maintain the liquid level in the mixing vessel at a desired level for proper vortex development.

13 Claims, 2 Drawing Sheets

LIQUID LEVEL CONTROL IN GAS-LIQUID MIXING OPERATIONS

BACKGROUND OF THE INVENTION

1. Field of the Invention

This invention relates to gas-liquid mixing operations. More particularly, it relates to batch gas-liquid mixing wherein a substantial variation in liquid volume occurs over the course of the mixing operation.

2. Description of the Prior Art

An advantageous gas-liquid mixing process and apparatus suitable for batch processing operations is disclosed in the Litz patent, U.S. Pat. No. 4,454,077, and the related reissue patent, U.S. Pat. No. Re. 32,562. This gas-liquid mixing technology has been referred to in the art as the Advanced Gas Reactor (AGR) system. As commonly and advantageously employed for a variety of practical commercial applications, the AGR system incorporates an open-ended hollow draft tube in a gas-liquid mixing vessel adapted to contain a body of said liquid. A down-pumping impeller positioned within the hollow draft tube is employed to pump liquid in said body of liquid into the top of said hollow draft tube for discharge at the bottom thereof and overall movement in a recirculating flow path in the mixing vessel. Because of such recirculation of the liquid downward in the hollow draft tube and upward in the vessel outside said tube, and aided by the positioning of baffles at the top of said draft tube, vortices are formed in the inlet area of the draft tube, such as to draw feed gas from the overhead space above the liquid level in the vessel into the recirculating liquid passing downward into the draft tube. It is this gas ingestion mechanism that provides a major benefit of the AGR system.

Satisfactory vortex development for such gas-liquid mixing purposes depends, among various practical operating factors, on the maintaining of a proper liquid level above the top of the draft tube. At any particular liquid flow rate down the draft tube, the maximum gas ingestion will occur at a particular operating liquid level in the vessel above the draft tube. The liquid flow rate, in turn, is a function of the impeller-draft tube design and the rotational speed of the impeller. Thus, for a 9" double helical impeller, with a single 9" pitch length, running at 400 RPM, in water, within a baffled 10" inside diameter draft tube, the optimum liquid level is about 4" above the top of the draft tube. If the liquid level were about 8" above the top of the draft tube, however, the vortices would typically no longer form, and the gas ingestion rate would drop essentially to zero. Thus, operating at liquid levels above the optimum level can substantially reduce the gas ingestion capabilities of the AGR system.

In gas-liquid mixing operations subject to such non-optimum liquid levels, therefore, the effectiveness of the AGR system in achieving enhanced gas-liquid mixing may be seriously impaired. Typical gas-liquid mixing applications in which an increasing liquid level may cause such non-optimum operation of an AGR system involves the production of aluminum alkyls or the hydrogenation of nitro compounds. When nitrobenzene is hydrogenated to form aniline, for example, water is formed as a by-product. If the AGR reactor (mixing) vessel were initially filled to the optimum level of liquid nitrobenzene to obtain good gas ingestion, via the vortex mechanism referred to above, the level of liquid would rise as the reaction proceeded. Thus, the by-product water produced would increase the liquid volume and cause the liquid level to rise in the vessel. A point would be reached when the liquid level became so high that the vortices would no longer form. At this stage of the operation, the reaction would stop because of the lack of hydrogen gas bubbles in the liquid phase. It will also be appreciated that, prior to reaching such stage, the rise in liquid level can be such that vortex formation and gas ingestion are less favorable than occurs when the liquid level is at the optimum level for the particular system.

In large commercial units for the carrying out of such reactions, the liquid level might desirably be, for example, about 18 inches, plus or minus 2 inches, above the draft tube. In such AGR applications, a volume change from the beginning of a batch to the end thereof may be on the order of 20 to 150% of the starting volume in the mixing vessel. In typical AGR reactors employed for such process reactions, this volume change will result in a liquid level change ranging from about 12 to 60 inches. As indicated above, such liquid level variations can cause a significant decrease in the effectiveness of the AGR system, even to the point where the desirable AGR system cannot be employed for gas-liquid mixing operations of practical commercial significance.

Because of the highly desirable gas-liquid mixing action achievable by the use of the AGR system, there is a desire in the art for further developments enabling the AGR system to be operated, and its benefits achieved, over a broader range of liquid levels. Such developments, enabling the AGR system to accommodate applications subject to a non-optimum liquid level, as for example, a rising level of liquid within the mixing vessel, would enable the use of the AGR system to be desirably extended to a wider variety of practical gas-liquid mixing operations for which enhanced mixing, and enhanced gas utilization, are desired in commercial operations.

It is an object of the invention, therefore, to provide an improved AGR system and process for gas-liquid mixing.

It is another object of the invention to provide an AGR system and process capable of effective operation over a substantial range of liquid levels in the course of a given gas-liquid mixing operation.

With these and other objects in mind, the invention is hereinafter described in detail, the novel features thereof being particularly pointed out in the appended claims.

SUMMARY OF THE INVENTION

The invention comprises a process and system for maintaining the volume of liquid within the mixing vessel of an AGR system constant, so as to keep the liquid height above the top of the draft tube at essentially the optimum level for desired gas ingestion purposes. A surge tank or other secondary volume capacity is employed to accommodate changes in liquid volume, with the gas phase pressure therein being adjusted to cause liquid to be moved into or out of said surge tank, thus enabling the liquid level within the AGR mixing vessel to be maintained at the desired level.

BRIEF DESCRIPTION OF THE DRAWINGS

The invention is further described with reference to the accompanying drawings in which.

DETAILED DESCRIPTION OF THE INVENTION

The objects of the invention are accomplished by providing a secondary volume capacity for the accommodation of liquid volume changes that occur in the course of a desired gas-liquid mixing operation, together with pressure control means for causing liquid to pass into or out of said secondary volume capacity in response to changes in liquid level within the AGR gas-liquid mixing vessel. Thus, the liquid level in said mixing vessel can be maintained at essentially the optimum level for proper vortex development and the desired ingestion of gas from the overhead gas space within the mixing vessel.

Figure 1:
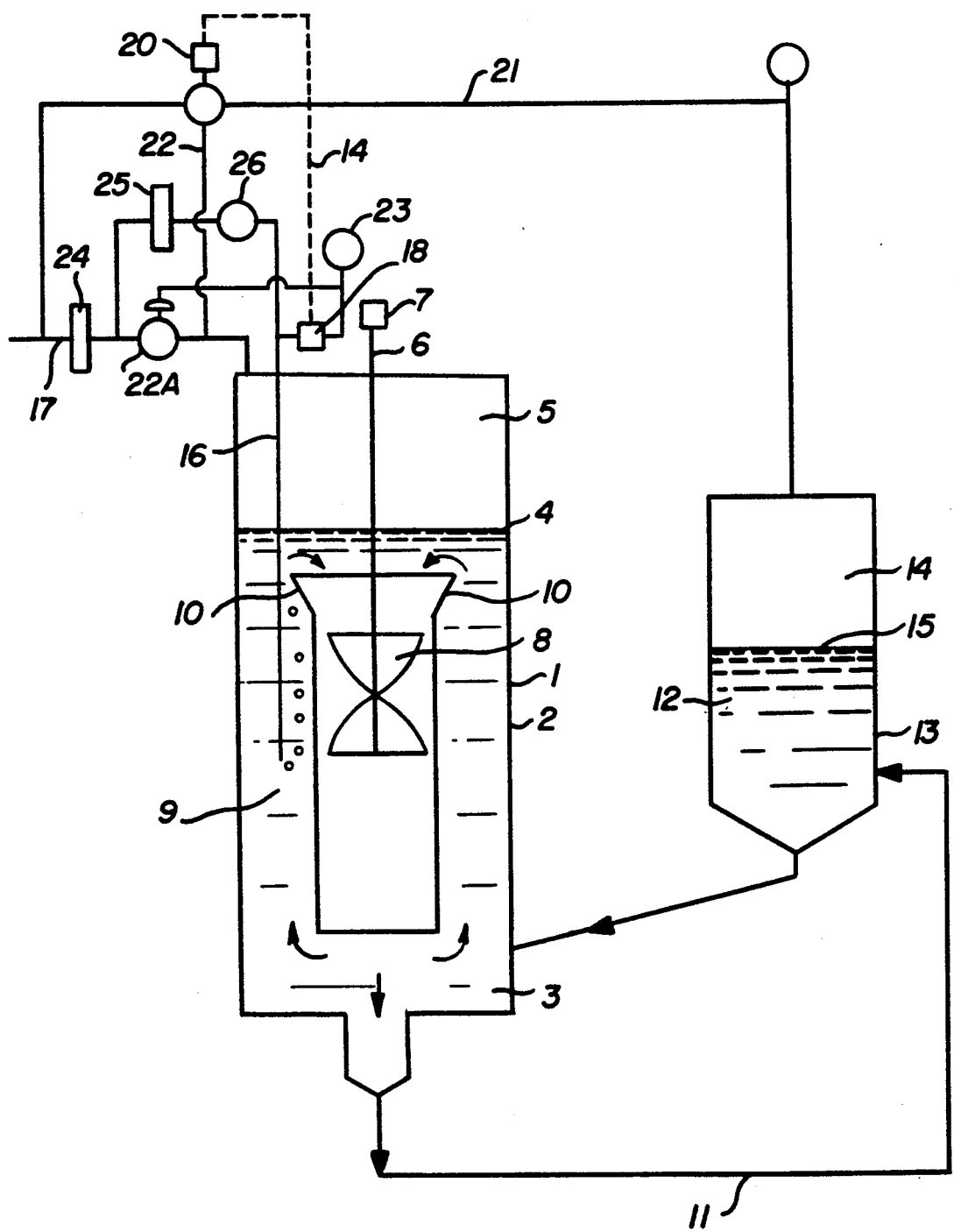
FIG. 1 is a side elevational schematic view illustrating an embodiment of the invention, including the surge tank feature for desired liquid level control.

With reference to FIG. 1 of the drawing, the hollow draft tube of the invention, represented by the numeral 1, is positioned within enclosed reactor or mixing vessel 2 containing a body of liquid 3 to be mixed with a gas. Said liquid has an optimum liquid level 4, with an overhead gas space 5 existing within mixing vessel 2. As will be seen in the drawing, draft tube 1 is positioned within the body of liquid 3, below liquid level 4, i.e, the gas-liquid interface within the vessel. Impeller shaft, having suitable drive means 7, has downward pumping helical impeller means 8 affixed thereto.

Draft tube 1 will be understood to extend from above the upper end of helical impeller 8 to a point below the lower end thereof that is substantially above the floor of the enclosed mixing vessel. Thus, adequate room is provided for liquid circulation down the inside of draft tube 1 and in an upward direction in the annular space 9 between said draft tube 1 and the walls of the mixing vessel. In order to facilitate such desired recirculation pattern, vertically positioned inlet guide baffles, not shown, are commonly provided in the region of the upper inlet end of draft tube 1 to assist in the directing of the upwardly flowing liquid in annular space 11 into the vortices created by the rotation of helical impeller 8 for downward passage within draft tube 1. It will also be noted, in the illustrated embodiment, that the top portion of draft tube 1 is an outwardly flared conical inlet section 10, employed to further facilitate the passage of upwardly flowing liquid in annular space 9 into said draft tube 1 for downward flow therein. Such conical section 10, preferably employed but not essential to the gas-liquid mixing operation carried out in the mixing vessel, is such that the wall thereof forms an obtuse angle of from about 145° to about 175° with the wall of said draft tube 1.

The body of liquid 3 is in fluid communication through line 11 with liquid phase 12 within surge tank 13, which provides the secondary volume capacity of the invention. Gas phase 14 above variable liquid level 15 in surge tank 13 is maintained at a controlled, but variable, pressure relative to overhead gas phase 5 in AGR mixing vessel 2. By adjusting the relative pressure in surge tank 13, the volume of liquid in said surge tank 13 can be varied, as necessary, to accommodate changes in the total volume of material in the overall system, thereby maintaining the level of liquid above draft tube 1 essentially constant through the desired gas-liquid mixing operation.

In the illustrated embodiment, it will be appreciated that, if the gas pressure in both vessels is the same, the liquid level in each vessel will be in the same horizontal plane. If the gas pressure in surge tank 13 is increased relative to that in AGR mixing vessel 2, liquid will flow from surge tank 13 to AGR mixing vessel since they are in liquid phase communication through line 11, until the hydrostatic head difference between the two vessels is equal to said gas pressure difference. The reverse liquid flow would occur if the gas pressure in AGR mixing vessel 2 were higher than that in surge tank 13. In the practice of the invention, the gas pressure difference is modulated in response to a liquid level controller that senses or monitors the liquid level in AGR mixing vessel 2, thereby enabling the system to maintain the desired liquid level 4 above draft tube 1 while the total liquid volume within the system is changing as batch gas-liquid mixing operations are carried out in said mixing vessel 2.

In the FIG. 1 embodiment, a conventional bubbler-type liquid level controller is illustrated. Thus, a slow flow of gas bubbling out of the submerged end of line 16 of bubbler supply line 16 is used to sense the liquid level within mixing vessel 2 in terms of the hydrostatic pressure that must be overcome in order to form gas bubbles in the body of liquid 3 in mixing vessel 2. Said slow flow of gas is conveniently obtained by diverting a portion of the gas being passed from a source of supply through line 17 to overhead gas space 5 for passage through said bubbler supply line 16. A commercially available differential pressure cell 18 is connected to sense the difference in pressure between bubbler supply line 16 and overhead gas space 5 in mixing vessel 2. Said DPC 18 can be adapted to send either an electrical or a pneumatic signal through line 19 to four-way control valve 20. Depending on the pressure differential sensed, said signal will result in (1) gas being fed through line 21 from supply line 17 into the overhead gas space 14 in surge tank 13, (2) gas being withdrawn from said overhead gas space 14 through said line 21 for passage through recycle line 22 to line 17 for passage into overhead space 5 in gas-liquid mixing vessel 2, or (3) the gas volume in surge tank 13 being held constant, depending upon how the liquid level in AGR mixing vessel 2 needs to be adjusted relative to the set point represented by the desired liquid level 4 within said mixing vessel 2. It will be understood that any other convenient and known means can be employed to monitor the liquid level in the mixing vessel.

The liquid level control system of the invention can, as indicated, be conveniently tied into the AGR reactor's primary gas supply. The head space pressure within overhead gas space 5 of mixing vessel 2 is conveniently maintained by pressure regulator 22A in gas supply line 17 in response to pressure indicator means 23. Flowmeter 24 in said line 17 measures the total amount of gas being supplied to mixing vessel 2 to replace gas that is consumed by the dispersion and reaction of gas within the body of liquid 3 in said mixing vessel 2. The bubbler gas flow rate in line 16 is measured by flowmeter 25, with the flow in said line being regulated by valve 26.

If desired, a recirculation line 26A may be used to facilitate the recirculation of liquid from surge tank 13 back through mixing vessel 2. This optional feature would permit unreacted reagents in said surge tank 13 to be reacted as part of the total batch operation. The particular recirculation circuit shown in the drawing, wherein line 11 is positioned at the bottom of gas-liquid mixing vessel 2 under draft tube 1, is advantageous in that the dynamic pressure head existing directly below the discharge end of said draft tube can be used to pump the liquid from mixing vessel 2 to surge tank 13.

Figure 2:
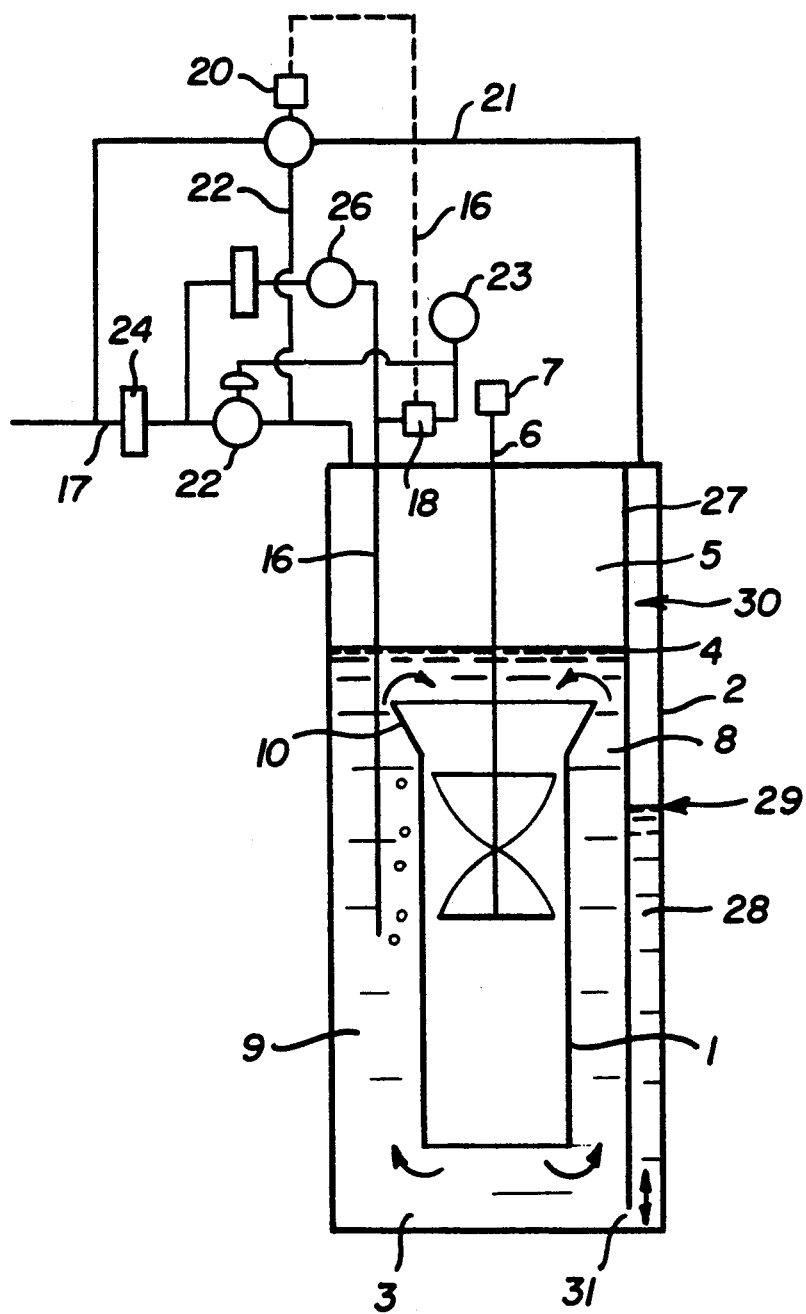
FIG. 2 is a side elevational schematic view illustrating an alternative embodiment of the invention wherein a partitioned portion of the gas-liquid mixing vessel is used to provide the desired secondary volume in place of said surge tank.

In the alternative embodiment illustrated in FIG. 2 of the drawing, it will be appreciated that elements 1–10 thereof are the same as indicated above with respect to the FIG. 1 embodiment. In place of the secondary volume capacity of the invention being provided by an external surge tank, however, a portion of AGR gas-liquid mixing vessel 2 is vertically partitioned off to provide the desired secondary volume capacity. Thus, partition 27 that extends from the upper end of mixing vessel 2 to a position near the bottom thereof provides a space within mixing vessel 2 equivalent to that provided by surge tank 13 in the FIG. 1 embodiment. Thus, liquid phase 28, having variable liquid level 29, with secondary gas space 30 are partitioned from the main portion of mixing vessel 2. Opening 31 at the bottom of partition 27 enables liquid to pass to and from the main body of liquid 3 and said liquid phase 28 in the practice of the invention. The liquid level control system of the FIG. 2 embodiment will be seen to be the same as that of the FIG. 1 embodiment except that line 21 extends from gas supply line 17 to the partitioned off portion of mixing vessel 2 in which secondary gas space 30 and liquid phase 28 are contained.

Those skilled in the art will appreciate that various changes and modifications can be made in the details of the AGR system and process herein described without departing from the scope of the invention as set forth in the appended claims. For example, the AGR system can employ any suitable axial flow down-pumping impeller means to create the desired downward flow of liquid in the draft tube and resulting vortex formation. While helical impellers typically with a single or double helix configuration, are generally preferred, marine impellers or other commercially available axial flow impellers can also be employed. In addition, the AGR system of the invention can include baffles at the lower outlet end of the draft tube and at the upper inlet end of said draft tube. Such outlet baffles can be employed to facilitate the circulation of liquid upward in the annular space between the draft tube and the walls of the mixing vessel and downward through the draft tube, and to reduce the size of the gas bubbles exiting from the lower end of the draft tube. It will also be appreciated that the components of the AGR system can be made of any convenient, conventional materials compatible with the contemplated gas-liquid mixing operation to be carried out therein. Thus, various metal alloys, plastics and glass materials may be employed in particular applications. Representative examples of suitable materials include stainless steel, rubber coated steel and titanium.

As in the conventional AGR technology disclosed in the cited patents, turbulence promoter blades and radial flow impellers an also be positioned within the hollow draft tube to further enhance the effectiveness of the overall gas-liquid mixing operation. In addition, it should be noted that the providing of a conical connection at the bottom of the AGR mixing vessel and the bottom of the surge tank would be desirable to accommodate the efficient transfer of catalyst particles that may be used with respect to a particular gas-liquid reaction. It will also be appreciated that the transfer line between said vessels should be sized to provide adequate velocity to carry such catalyst particles with the flowing stream. The use of a somewhat enlarged exit connection from the AGR mixing vessel would add to the momentum transfer and allow increased pumping rates in the recirculation system. Pumping means, such as a conventional pump or a gas-liquid system can also be utilized in the recirculation line between the vessels.

The invention can be used to enhance gas ingestion from an overhead gas space by vortex development in any AGR gas liquid mixing operation that is subject to variations in liquid level during the course of said mixing operation. By the use of a surge tank or other secondary volume capacity and the liquid level control feature as herein described and claimed, excess liquid can be removed from the AGR mixing vessel so that the optimum liquid level for proper vortex development can be maintained throughout the mixing operation although the total liquid volume is increasing as the gas-liquid mixing operation is continued. The practice of the invention enables the range of applications in which the enhanced gas-liquid mixing of the AGR technology is applicable to be extended to include commercially significant gas-liquid mixing operations and reactions in which volume changes might otherwise preclude the proper vortex development necessary to adequately achieve the gas ingestion and enhanced gas-liquid mixing otherwise obtainable using the highly advantageous AGR technology approach. By thus extending the range of applications of the AGR technology, the invention provides a highly significant advance in the art, applicable to a variety of applications in which hydrogen, oxygen or other industrial gases are to be mixed with liquid in practical commercial operations.

We claim:

1. In a process for mixing a gas and a liquid in a mixing vessel having a hollow draft tube with an axial flow, down-pumping impeller means positioned therein for vortex development and the ingestion of gas from an overhead space within the mixing vessel into the body of liquid therein, said gas-liquid mixing operation resulting in liquid volume changes within the mixing vessel, the improvement comprising:

(a) maintaining a secondary volume capacity, within or external to said body of liquid within the mixing vessel, for the accommodation of said liquid volume changes during the course of the gas-liquid mixing operation, with communication being provided between said body of liquid in the mixing vessel and said secondary volume capacity so that liquid can be passed from said body of liquid in the mixing vessel to said secondary volume capacity;

(b) monitoring the liquid level of said body of liquid in the mixing vessel throughout the course of the gas-liquid mixing operation; and (c) modulating the pressure in the gas space of said secondary volume capacity in response to changes in the liquid level that occur with respect to said body of liquid in the mixing vessel so as to maintain the desired liquid level of the body of liquid for vortex development and gas ingestion while the total volume of liquid is changing over the course of said gas-liquid mixing operation, whereby the secondary volume capacity is effectively utilized to accommodate volume changes that occur throughout the gas-liquid mixing operation so that the desired liquid level can be maintained for proper vortex development and gas ingestion from the overhead gas space in said mixing vessel.

2. The process of claim 1 in which said secondary volume capacity comprises an external surge tank.

3. The process of claim 1 in which said secondary volume capacity comprises a partitioned portion of said gas-liquid mixing vessel.

4. The process of claim 1 in which the liquid level in said body of liquid is monitored by bubbling gas into said body of liquid to sense the liquid level thereof in terms of the hydrostatic pressure that must be overcome to form gas bubbles at a particular position in said body of liquid.

5. The process of claim 4 in which said gas bubbled into the body of liquid comprises a portion of the gas being passed to said mixing vessel for the desired gas-liquid mixing operation.

6. The process of claim 1 and passing gas between said secondary volume capacity and the gas feed line to said mixing vessel for the desired gas-liquid mixing operation.

7. In an apparatus for mixing a gas and a liquid in a mixing vessel having a hollow draft tube with an axial flow, down-pumping impeller means positioned therein for vortex development and the ingestion of gas from an overhead gas space within the mixing vessel into the body of liquid therein, said gas-liquid mixing operation resulting in liquid volume changes within the mixing vessel, the improvement comprising:

(a) a secondary volume capacity, within or external to said body of liquid within the mixing vessel, for the accommodation of said liquid volume changes during the course of the gas-liquid mixing operation;

(b) communication means between the body of liquid in the mixing vessel and said secondary volume capacity so that liquid can be passed from said body of liquid in the mixing vessel to said secondary volume capacity;

(c) means to monitor the liquid level in said body of liquid in the mixing vessel throughout the course of the gas-liquid mixing operation; and (d) conduit means for passing gas to or from the gas space of said secondary volume capacity in response to changes in the liquid level that occur with respect to said body of liquid in the mixing vessel so as to maintain the desired liquid level of the body of liquid for vortex development and gas ingestion while the total volume of liquid is changing over the course of said gas-liquid mixing operation, whereby the secondary volume capacity is effectively utilized to accommodate volume changes that occur throughout the gas-liquid operation so that the desired liquid level can be maintained for proper vortex development and gas ingestion from the overhead gas space in said mixing vessel.

8. The apparatus of claim 7 in which said secondary volume capacity comprises an external surge tank.

9. The apparatus of claim 7 in which said secondary volume capacity comprises a partitioned portion of said gas-liquid mixing vessel.

10. The apparatus of claim 7 in which said monitoring means comprises means for bubbling gas into said body of liquid and determining the hydrostatic pressure that must be overcome to form gas bubbles at a particular position in said body of liquid.

11. The apparatus of claim 10 and including conduit means for diverting a portion of the gas being passed to said mixing vessel for the desired gas-liquid mixing operation for said pressure monitoring purposes.

12. The apparatus of claim 7 and including fluid communication means for the passage of gas between said secondary volume capacity and the gas being passed to the mixing vessel for the desired gas-liquid mixing operation.

13. The apparatus of claim 12 and including valve means for controlling the passage of gas to said secondary volume capacity, from said secondary volume capacity, and, as appropriate, to preclude the flow of gas to or from said secondary volume capacity.

* * * * *